(12) United States Patent
Smith et al.

(10) Patent No.: US 8,397,649 B2
(45) Date of Patent: Mar. 19, 2013

(54) PALLET

(75) Inventors: Victor Smith, Auckland (NZ); Lee Smyth, Auckland (NZ); Mark Appleton Hildesley, Auckland (NZ)

(73) Assignee: Yah Corp Industries Limited, Avondale, Auckland (NZ)

( * ) Notice: Subject to any disclaimer, the term of this patent is extended or adjusted under 35 U.S.C. 154(b) by 761 days.

(21) Appl. No.: 12/289,036

(22) Filed: Oct. 17, 2008

(65) Prior Publication Data

US 2009/0114129 A1 May 7, 2009

Related U.S. Application Data

(63) Continuation-in-part of application No. PCT/NZ2007/000086, filed on Apr. 20, 2007.

(60) Provisional application No. 60/793,224, filed on Apr. 20, 2006.

(51) Int. Cl.
*B65D 19/00* (2006.01)

(52) U.S. Cl. ...................................... 108/57.25; 108/901

(58) Field of Classification Search ................. 108/901, 108/902, 56.1, 56.3, 51.11, 57.25, 57.27, 108/57.28, 57.33, 57.34
See application file for complete search history.

(56) References Cited

U.S. PATENT DOCUMENTS

| | | | | |
|---|---|---|---|---|
| 3,667,403 A * | 6/1972 | Angelbeck, Jr. | ............ | 108/57.26 |
| 3,699,902 A * | 10/1972 | Allgeyer et al. | ............ | 108/57.26 |
| 3,828,965 A * | 8/1974 | Yarbrough | ...................... | 220/1.5 |
| 4,025,686 A * | 5/1977 | Zion | ............................. | 442/373 |
| 5,057,350 A * | 10/1991 | Gezels | ........................... | 428/138 |
| 5,343,814 A | 9/1994 | Pigott et al. | | |
| 5,440,998 A * | 8/1995 | Morgan et al. | ............. | 108/57.18 |
| 5,687,652 A | 11/1997 | Ruma | | |
| 6,006,677 A | 12/1999 | Apps et al. | | |
| 6,138,582 A | 10/2000 | Fujii et al. | | |
| 6,458,233 B2 * | 10/2002 | Carisella | ........................ | 156/189 |
| 6,470,810 B1 * | 10/2002 | Nishibori et al. | ........... | 108/57.28 |
| 6,659,020 B1 * | 12/2003 | Ball | ............................. | 108/57.28 |
| 6,748,876 B2 * | 6/2004 | Preisler et al. | ............. | 108/57.25 |
| 6,758,148 B2 * | 7/2004 | Torrey et al. | ................ | 108/51.11 |
| 6,784,234 B2 | 8/2004 | Adedeji et al. | | |
| 6,955,129 B2 * | 10/2005 | Moore et al. | ................ | 108/57.25 |
| 2002/0134284 A1 * | 9/2002 | Apps | ............................ | 108/57.25 |
| 2003/0180498 A1 * | 9/2003 | De Winter et al. | .............. | 428/67 |
| 2004/0118325 A1 | 6/2004 | Moore et al. | | |
| 2006/0003044 A1 * | 1/2006 | DiNello et al. | ................. | 425/412 |
| 2006/0201398 A1 * | 9/2006 | Moore et al. | ................ | 108/57.25 |
| 2006/0201402 A1 * | 9/2006 | Moore et al. | ................ | 108/57.25 |
| 2007/0261610 A1 * | 11/2007 | Dewing et al. | ................... | 108/59 |
| 2010/0043678 A1 * | 2/2010 | Linares | ....................... | 108/57.25 |

FOREIGN PATENT DOCUMENTS

| | | |
|---|---|---|
| EP | 0 798 220 | 10/1997 |
| FR | 2003758 | * 1/1970 |
| JP | 52032982 | 3/1977 |
| JP | 52033977 | 3/1977 |
| WO | WO 2005/090175 | 9/2005 |

* cited by examiner

*Primary Examiner* — Janet M Wilkens
(74) *Attorney, Agent, or Firm* — Jacobson Holman PLLC

(57) ABSTRACT

A pallet has an upper deck and a lower deck. The upper deck and the lower deck are connected by a plurality of spaced apart columns. Fork insertion apertures are formed by the upper deck, the columns and the lower deck to all four sides of the pallet. The pallet includes at least an upper deck member and a lower deck member, at least the lower deck member includes a low density core and a surrounding shell of reinforced plastic. The pallet may be made using reaction injection molding, with said plastic being predominantly polyurethane.

11 Claims, 15 Drawing Sheets

PALLET

This is a Continuation-in-part of PCT/NZ07/000086 filed Apr. 20, 2007 and published in English, claiming benefit of U.S. provisional application No. 60/793,224, filed Apr. 20, 2006, hereby incorporated by reference.

FIELD OF THE INVENTION

The present invention relates to pallets used for transporting and storing goods.

SUMMARY OF THE PRIOR ART

It has become commonplace to use a pallet when moving or storing small goods. In general a pallet consists of a rectangular platform that supports goods above a support surface such as a floor, or in a rack. The pallet includes openings on at least one side for receiving forks of a material handling vehicle such as a forklift or crane attachment. For improved working flexibility modern pallets are designed to have fork access from all four vertical sides.

Typically pallets have been constructed from wooden materials. For example a simple pallet construction that is commonly used includes three spaced apart stringers with a set of cross planks forming an upper deck and a reduced number of cross planks forming a lower deck. The upper and lower cross planks are fastened to the stringers. The fork openings are provided by the space between the stringers. Alternative wooden constructions include a plywood upper deck and a plywood lower deck, with the decks separated by a set of nine blocks. Four of the blocks are located at the corners of the pallet, four of the blocks are located at the centre of each side of the pallet, and one block is located in the centre. This provides a wooden pallet construction allowing access from four sides.

Wooden pallets have been known to be a potential fire hazard, are subject to regular damage during normal handling and use large quantities of timber which is an increasingly scarce resource. Alternative pallets have been proposed formed from plastic materials.

For example U.S. Pat. No. 6,006,677 proposes a four-way plastic pallet in which the upper deck and lower deck are moulded separately from high density polyethylene or polypropylene. The lower deck includes integral posts at the corners, at the centre of each side and at the centre of the rectangle. The top end of each of the posts are welded to the under surface of the upper deck to form a complete pallet.

U.S. Pat. No. 6,138,582 describes a similar pallet construction, except that a main portion of each column is formed with the upper deck and a further portion of each post is formed with the lower deck.

In each case the pallet structure includes a downwardly open cellular arrangement of walls or ribs on both the upper and lower deck and within the posts. This is provided for strength and stiffness without the weight of solid plastic to the same thickness. This arrangement provides a multitude of pockets or cavities on the pallet surface which may provide a repository for dirt or insects and be difficult to adequately clean. This presents a potential bio-security hazard.

U.S. Pat. No. 5,687,652 describes a monolithic pallet formed from self-skinning plastic foam injected into a mould cavity. Due to the limitations of this process the pallet does not include a complete lower deck, having cross members spanning in only one direction. Furthermore the process results in sharp edges and bluff faces at each fork entry port which increase the risk of damage to the pallet during normal handling.

It is an object of the present invention to provide a pallet which goes some way towards overcoming the above disadvantages or which will at least provide the industry with a useful choice.

SUMMARY OF THE INVENTION

In a first aspect the present invention broadly consists in a pallet having an upper deck and a lower deck, the upper deck and the lower deck being connected by a plurality of spaced apart columns, with fork insertion apertures formed by the upper deck, the columns and the lower deck to all four sides of the pallet, wherein said pallet includes at least an upper deck member and a lower deck member, at least the lower deck member including a low density core and a surrounding shell of reinforced plastic, and at least a lower portion of the columns being integrally formed with the lower deck member, at least the lower portion of the columns each having a solid plastic perimeter wall, the perimeter wall extending to a substantially lower most position of the pallet.

According to a further aspect, the low density core of the lower deck member is spaced from each column perimeter wall by a joining region.

According to a further aspect, the lower deck member includes a scalloped section around the lower portion of each column perimeter wall, the scalloped section being formed in a lower surface of the lower deck member, each scalloped section having a downwardly facing curved section where the scalloped section meets the perimeter wall of the column, the downwardly facing curved section defining a lower surface of the joining region.

According to a further aspect, the lower deck member includes an upwardly facing curved section where an upper surface of the lower deck member meets the perimeter wall of the column, the upwardly facing curved surface defining an upper surface of the joining region.

According to a further aspect, the joining region is reinforced plastic.

According to a further aspect, the upwardly facing curved section is located substantially above the downwardly facing curved section.

According to a further aspect, a base of each column is substantially in plane with a bottom surface of the lower deck member.

According to a further aspect, the lower deck member comprises eight side members, four centre members, four corner columns, four side columns and a central column, each corner column being located at a corner position of the lower deck member, each side column being located at a side of the lower deck member between two adjacent corner columns, the central column being located at a centre of the lower deck member, each side member extending along a side of the lower deck member between a corner column and an adjacent side column, and each centre member extending between a side column and the central column, each side member and each centre member comprising a separate low density core.

According to a further aspect, said plastic is reinforced with fibres.

According to a further aspect, the low density core of the lower deck member is spaced from each column perimeter wall by a joining region, and the fibre reinforcement is a fibre pre-form that extends into the joining region and the column solid plastic wall.

According to a further aspect, at least the lower portion of the columns is hollow.

In a further aspect the present invention broadly consists in a pallet having an upper deck and a lower deck, the upper deck and the lower deck being connected by a plurality of spaced apart columns, with fork insertion apertures formed by the upper deck, the columns and the lower deck to all four sides of the pallet, wherein said pallet includes at least an upper deck member and a lower deck member, at least the lower deck member including a low density core and a surrounding shell of reinforced plastic, with the exterior faces of said upper deck being substantially free of deep cavities, and said low density core comprises a foam core pre-form.

According to a further aspect, said lower deck also comprises a low density core and a surrounding shell of reinforced plastic, the low density core being a foam core pre-form.

According to a further aspect, the fibre reinforcement is a fibre pre-form surrounding the low density core.

According to a further aspect, said quantity of fibre reinforcement is at least 40% by weight of the plastic resin shell.

According to a further aspect, the pallet has a fibreless outer surface.

According to a further aspect, said plastic is predominantly polyurethane.

According to a further aspect, said top deck member or lower deck member or both are formed by Reaction Injection Moulding polyurethane plastic resin to surround a fibre and nested foam pre-positioned pre-form in a closed mould.

According to a further aspect, said top deck member or lower deck member or both are formed by Reaction Injection Moulding polyurethane plastic resin to surround a fibre and nested foam pre-positioned pre-form in a closed mould.

In a further aspect the present invention broadly consists in a pallet having an upper deck and a lower deck, the upper deck and the lower deck being connected by a plurality of spaced apart columns, with fork insertion apertures formed by the upper deck, the columns and the lower deck to all four sides of the pallet, the parts of said pallet being formed by reaction injection moulding using a polyurethane resin into a closed mould to infiltrate a fibre reinforced pre-form pre-positioned in said closed mould.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

DETAILED DESCRIPTION

Figure 1:
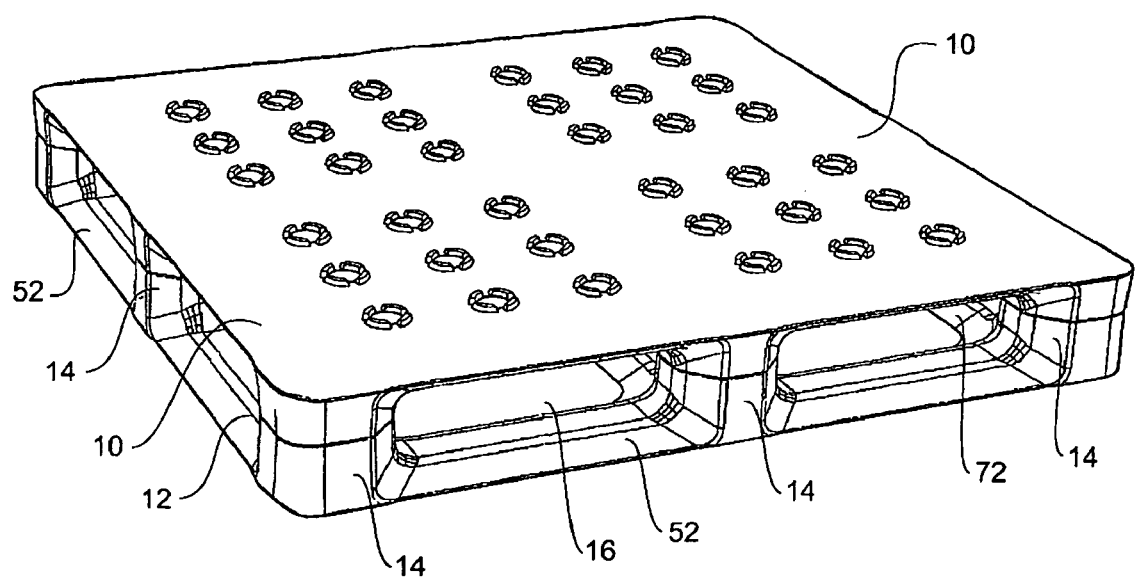
FIG. 1 is a perspective view of a pallet according to a first embodiment of the present invention.
Figure 2:
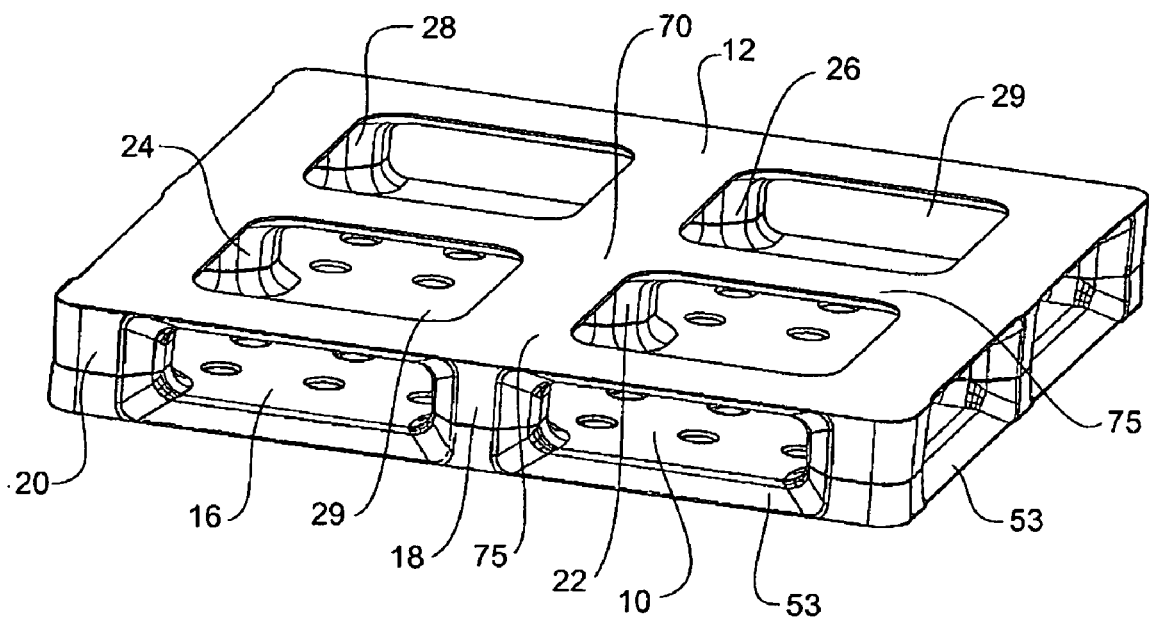
FIG. 2 is a perspective view from below of the pallet of FIG. 1.
Figure 3:
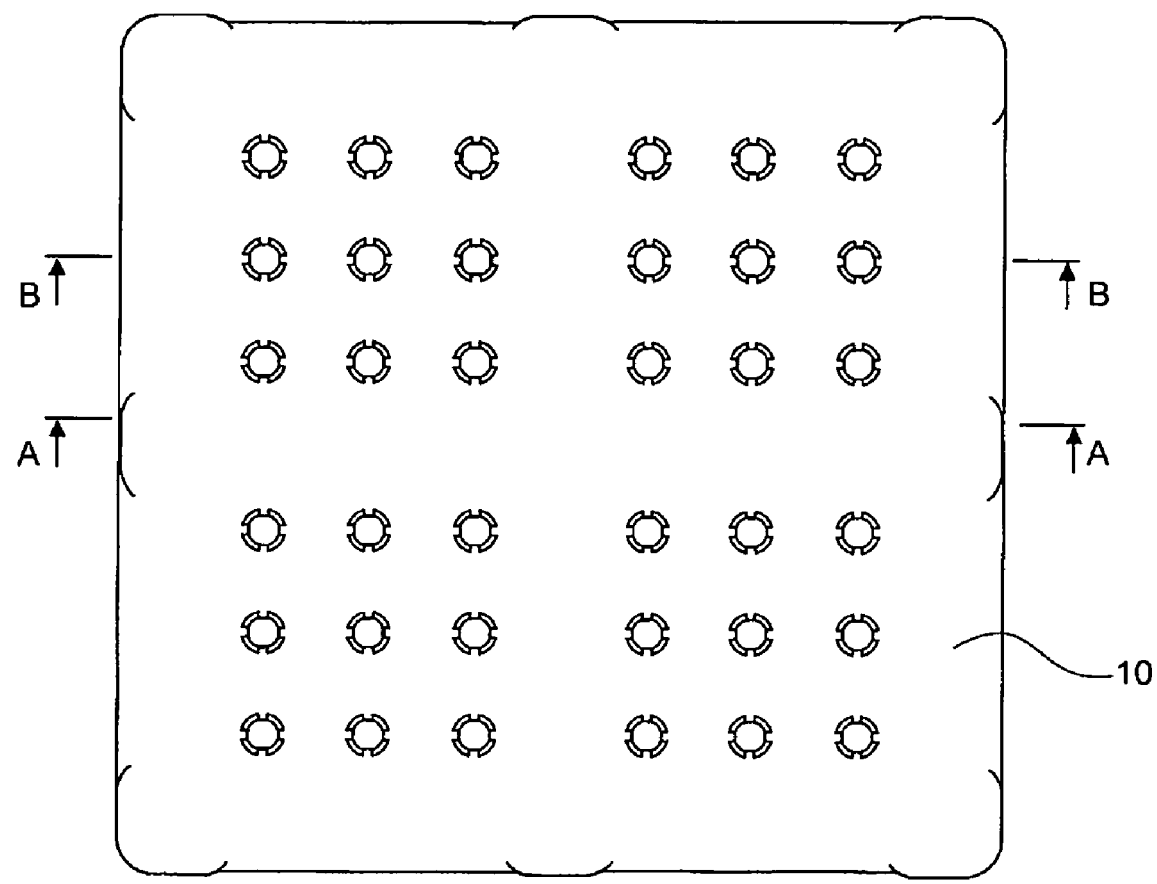
FIG. 3 is a top view of the pallet of FIG. 1.
Figure 7:
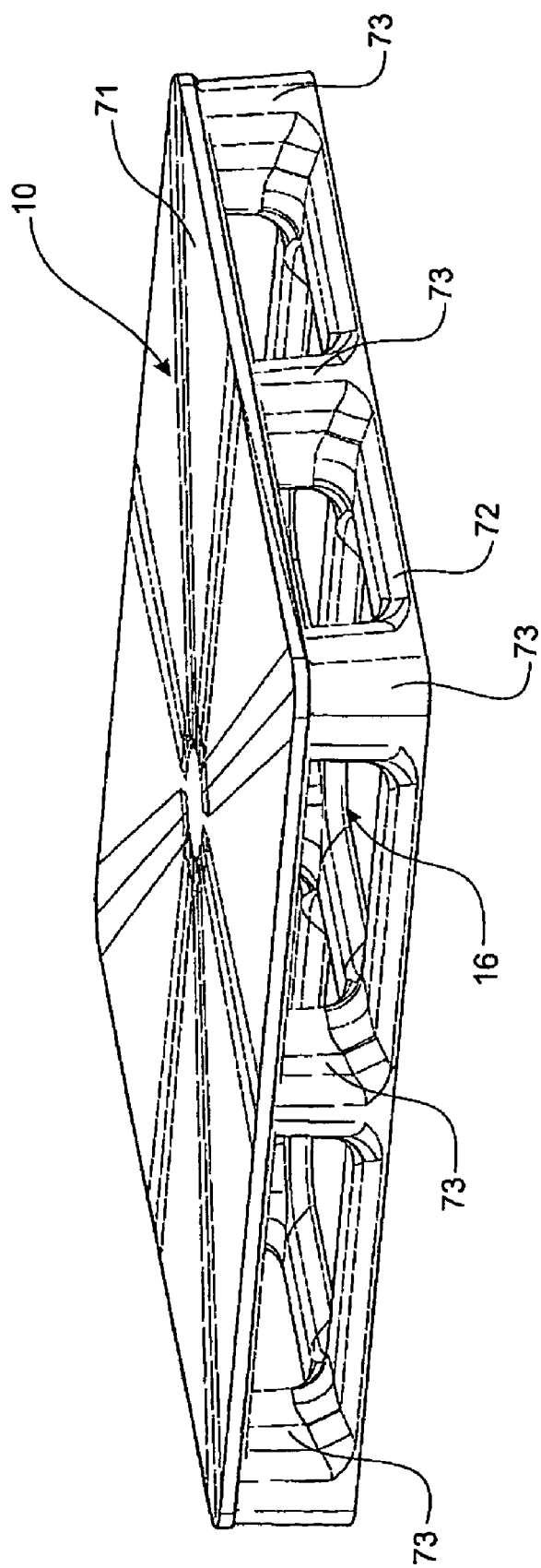
FIG. 7 is a perspective view of a pallet according to a second embodiment of the present invention.
Figure 8:
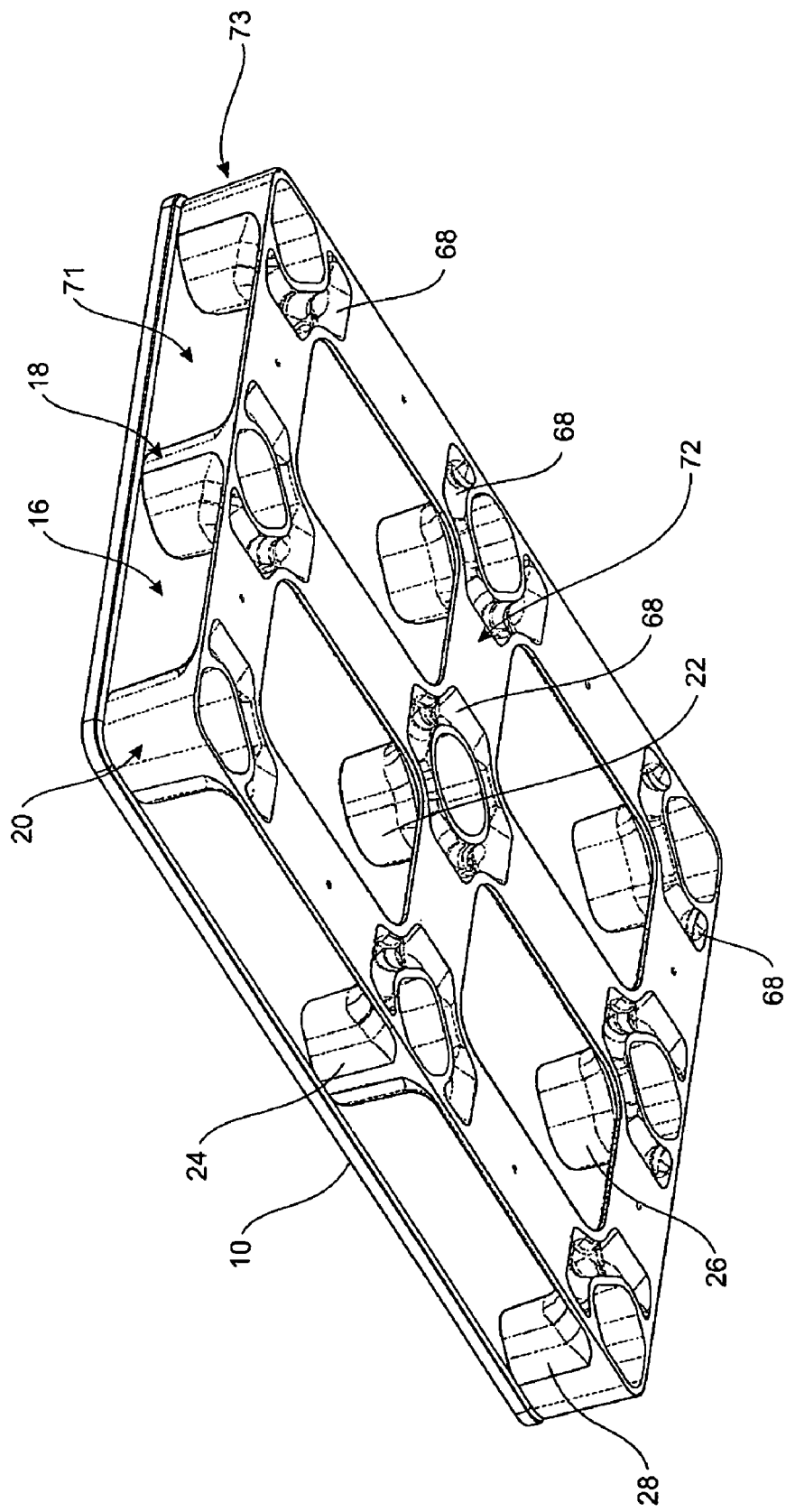
FIG. 8 is a perspective view from below of the pallet of FIG. 7.
Figure 9:
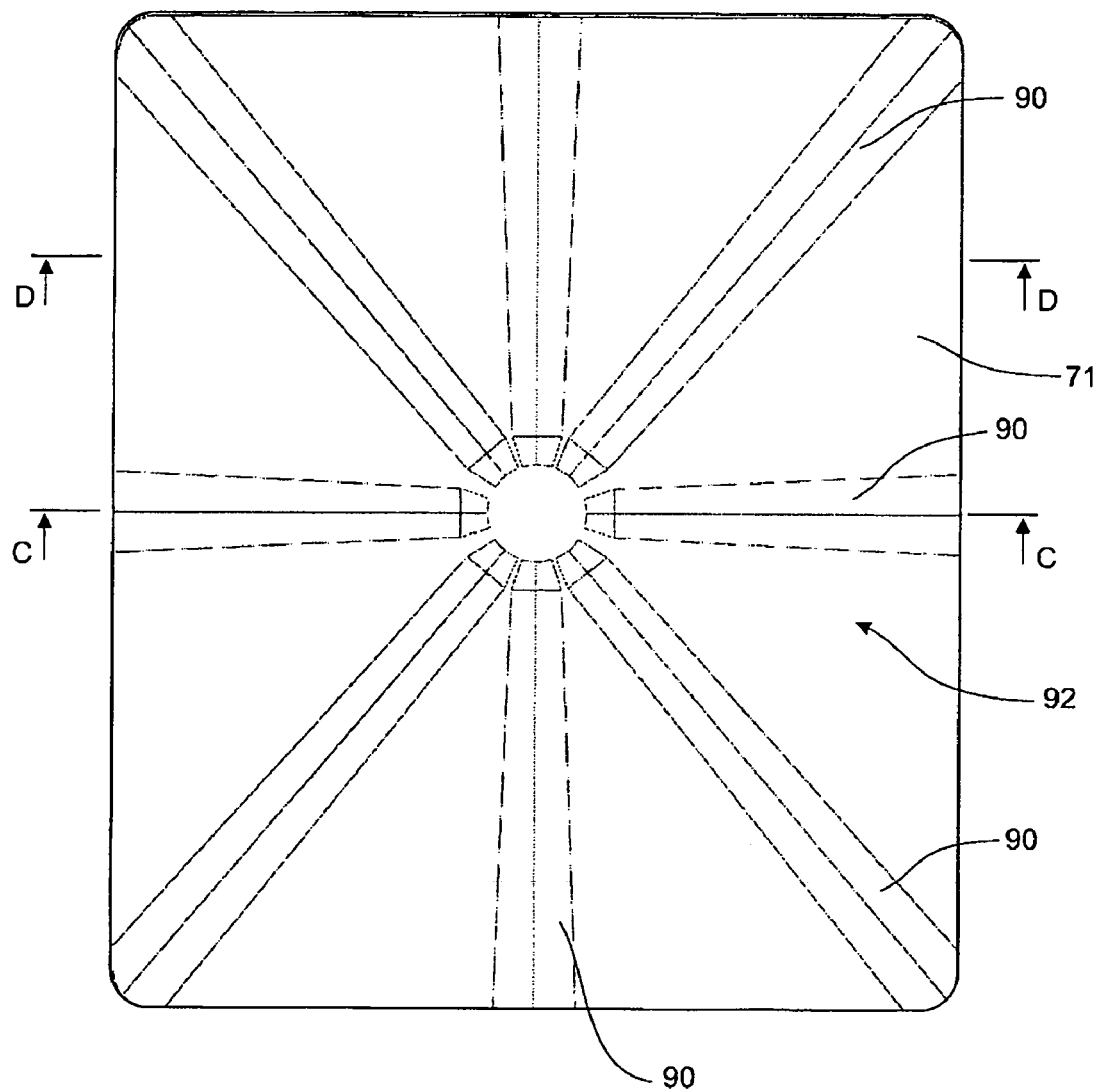
FIG. 9 is a top view of the pallet of FIG. 7.
Figure 10:
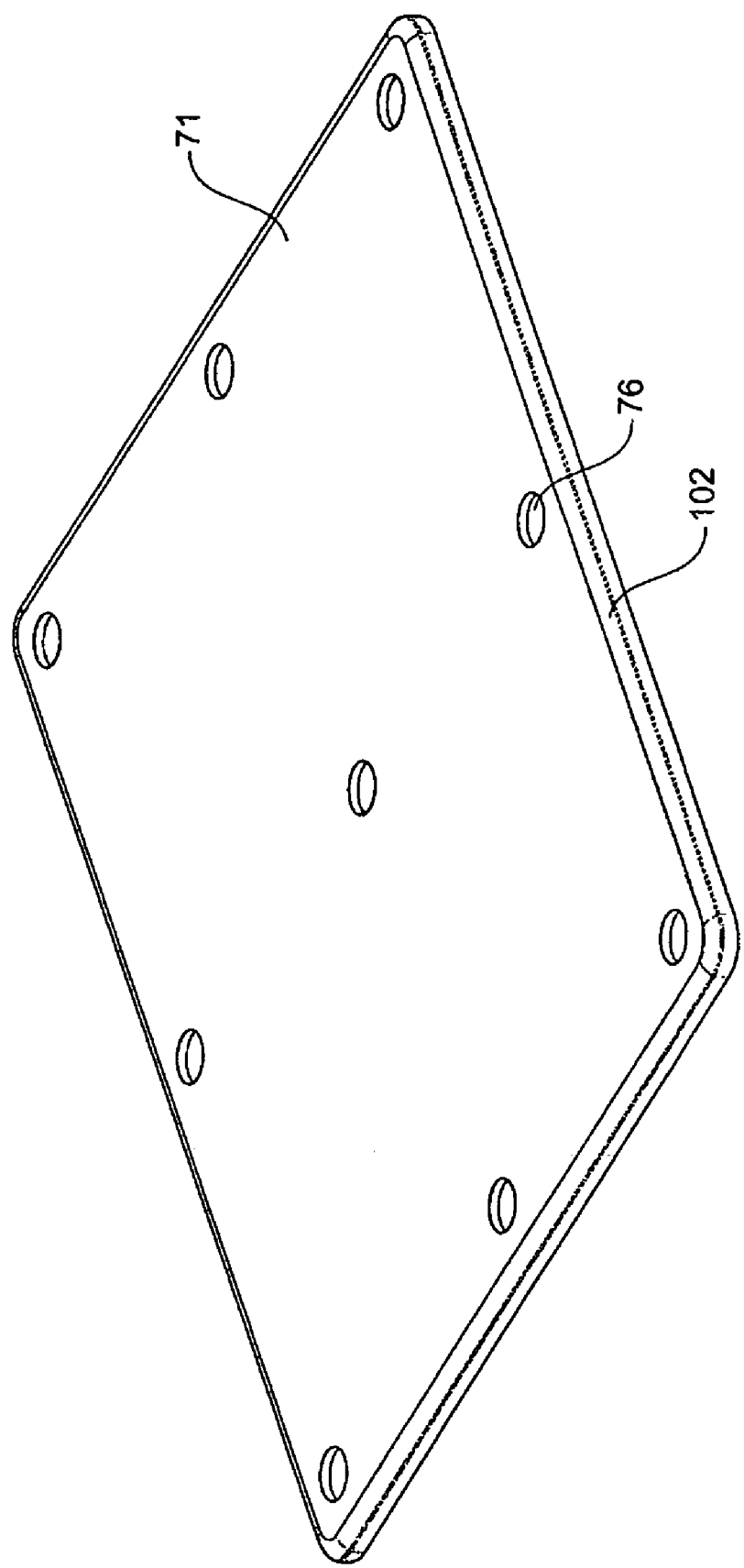
FIG. 10 is a view of the underside of the upper deck part of the pallet of FIG. 7.

Referring to FIGS. 1 to 3 and to FIGS. 7 to 9, the pallet according to the present invention includes an upper deck 10 and a lower deck 12. The upper deck 10 and the lower deck 12 are connected by a number of spaced apart columns 14, 73. The columns 14, 73 include a column at each corner of the pallet, a column at the centre of each side of the pallet, and at least one column at the centre of the pallet.

The upper deck 10, the lower deck 12 and the columns 14, 73 form fork insertion channels that extend through the pallet from each side of the pallet to the opposite side of the pallet. Each fork insertion channel is framed by a combination of the upper deck, lower deck and columns at three spaced locations. For example as shown in FIG. 2 fork insertion aperture 16 is framed by the upper deck 10, near side centre column 18, lower deck 12 and near side corner column 20 at one location, by the upper deck 10, central column 22, lower deck 12 and left side centre column 24 at a middle position and by upper deck 10, far side centre column 26, lower deck 12 and far side corner column 28 at its far end. A pair of such fork insertion channels extend through the pallet from each side. The channels of each side intersect with the perpendicular extending channels from each adjacent side. This provides a true four-way pallet which may be addressed by a fork lifting apparatus from any of the four sides.

The pallet is constructed from an upper deck portion and a lower deck portion. Each of the spaced apart columns comprises column portions formed integrally with the upper deck portion, the lower deck portion or both.

Figure 4:
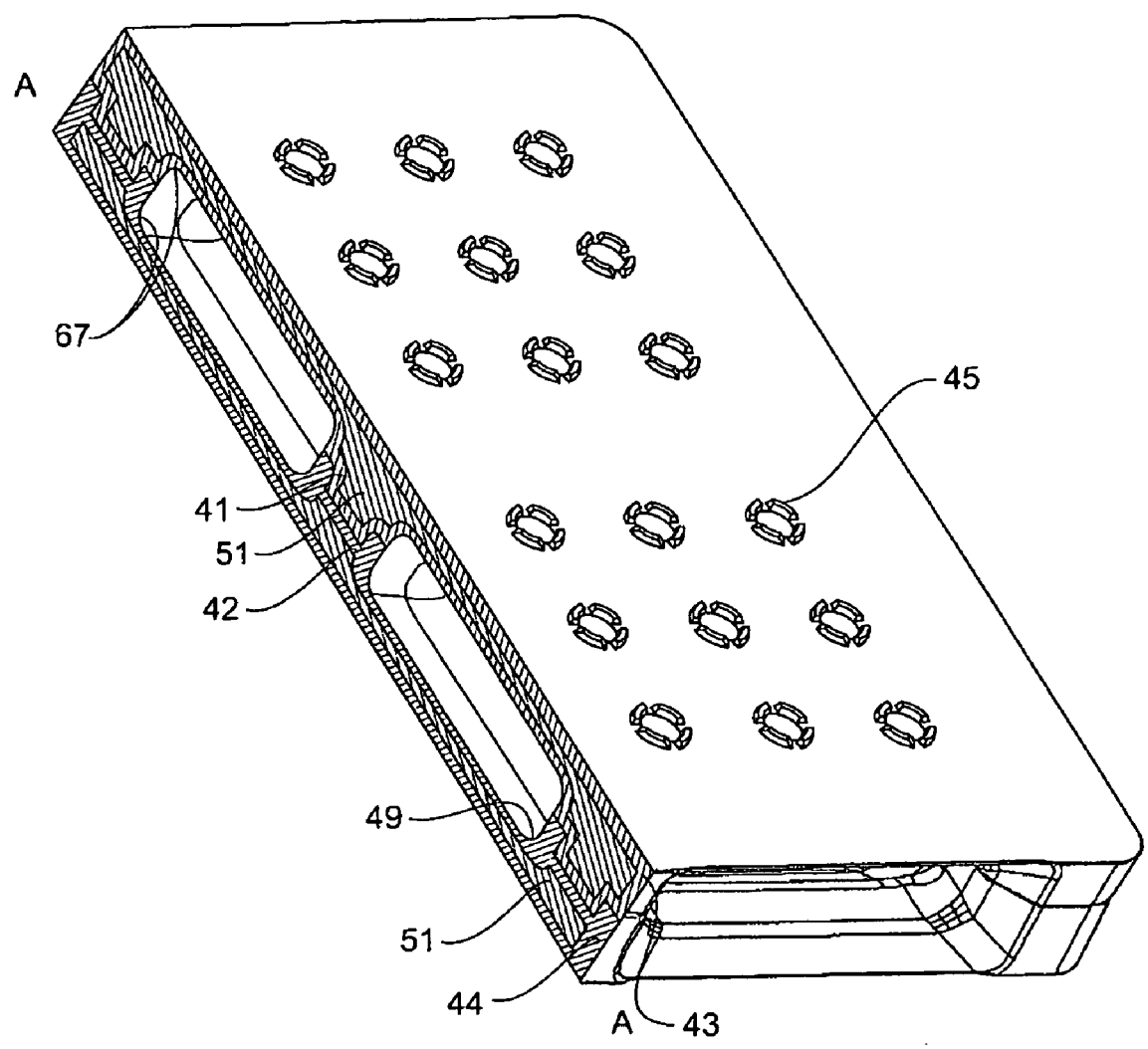
FIG. 4 is a perspective view sectioned along line AA in FIG. 3.

In the embodiment shown in FIG. 4 the upper deck portion is shown as member 41, and the lower deck portion as member 42. Referring to FIG. 4, each column of this embodiment includes an upper portion 43 integral with the upper deck member 41 and a lower portion 44 integral with the lower deck member 42. The upper deck member 41 and the lower deck member 42 are joined by connection of the respective column portions. Preferably the respective column portions are bonded together. The connection may include a mechanical interengagement, such as a socket joint including engaged male and female parts, which are preferably bonded in the engaged relationship.

Figure 11:
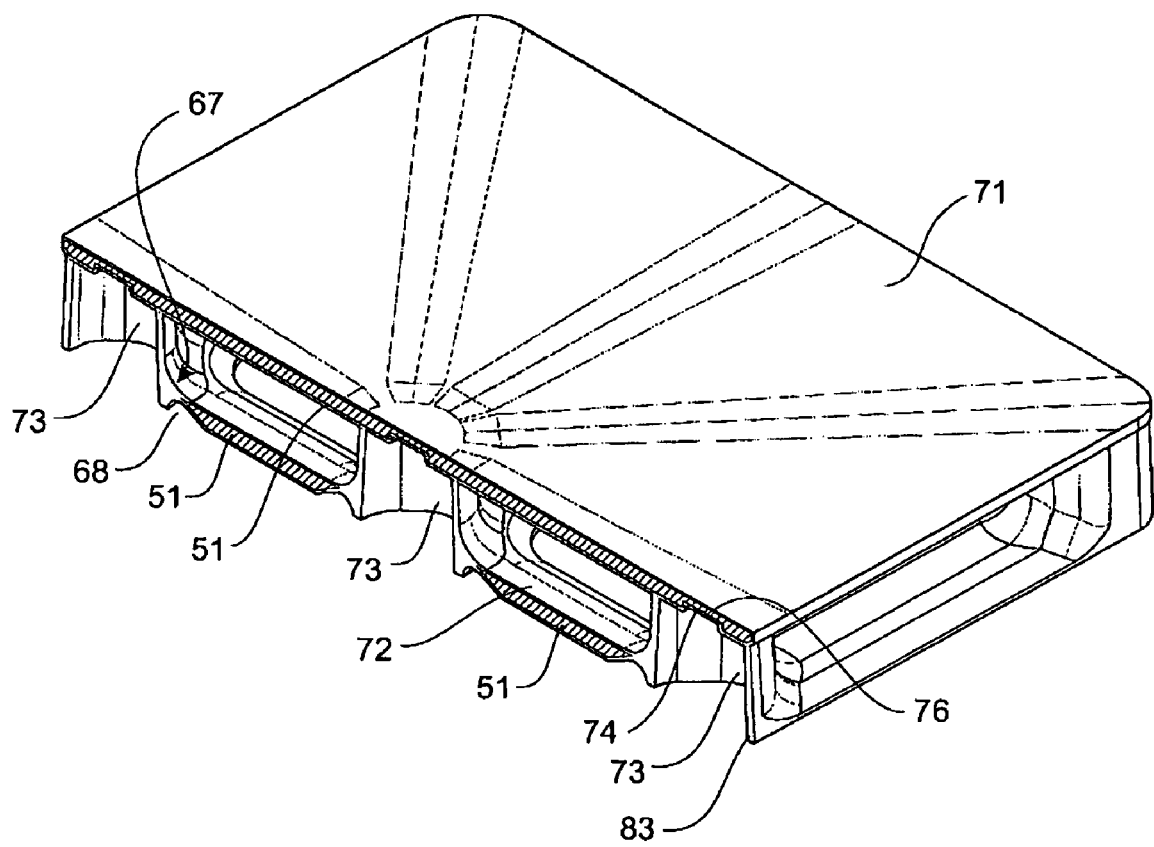
FIG. 11 is a perspective view sectioned along line CC in FIG. 9.
Figure 12:
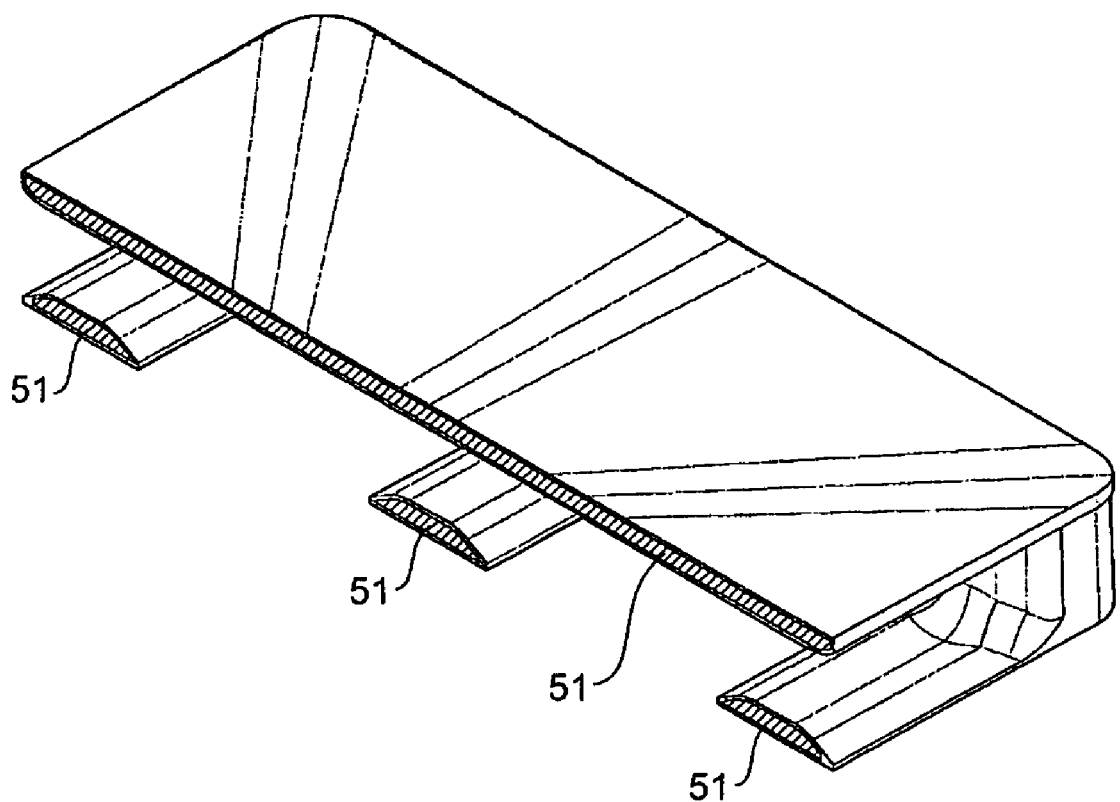
FIG. 12 is a perspective view sectioned along line DD in FIG. 9.

In the embodiment of FIGS. 7 to 9 the upper deck portion is shown as member 71, and the lower deck portion as member 72. Referring to FIG. 11, each column 73 of this embodiment is integral with the lower deck member 72. The upper deck member 71 and the lower deck member 72 are joined by connection of the top of each column 73 to the lower face of the upper deck. The under face of the upper deck member 71 may include locating depressions 76, with the respective column ends 74 being bonded into the locating depressions 76. Alternatively, the connection may include a mechanical inter-engagement, such as a socket joint including engaged male 77 and female 76 parts, which are bonded in the engaged relationship.

In the illustrated embodiment the column has a closed top with a male part 77 located at the top of the column, for inter-engagement with a corresponding female depression 76 in the under face of the top deck member. Alternatively, the top of the column may be the male part, interfacing with a corresponding female depression in the upper deck member, the top of the column being closed or open.

Alternatively, the upper deck member may have male parts extending downwards, with corresponding depressions in the top of each column. The depression may be formed in a closed top of each column. Alternatively, the column may be open to the top, with a male part of the upper deck member interfacing with an inside of the column. The male part of the upper deck member may include a section of the foam pre-form core 51, with a plastic resin outer shell. The plastic resin outer shell of the male part of the upper deck member may include fibre reinforcement. Alternatively, the male part of the upper deck may be solid plastic resin. The solid plastic resin male part may include fibre reinforcement.

Alternatively, the pallet may include hollow columns comprising an upper portion integral with the upper deck member and a lower portion integral with the lower deck member, with the upper deck member and the lower deck member being joined by connection of the respective column portions. The respective column portions may be bonded together. The connection may include a mechanical inter-engagement, such as a socket joint including engaged male and female parts. The socket joint may be bonded in the engaged relationship.

Alternatively, the pallet may include columns comprising an upper portion integral with the upper deck member and a lower portion integral with the lower deck member, with the upper portion of the column including a pre-form foam insert and the lower portion of the column being hollow.

The upper deck member 41, 71 and lower deck member 42, 72 are joined by mechanical engagement, or bonding, or both. To promote a secure engagement between the upper deck member and the lower deck member, the engagement is preferably a combination of a socket connection comprising male and female parts and bonding.

A suitable male part may comprise, for example, a cylindrical extension for insertion into a cylindrical cavity in the mating member. For the embodiment shown in FIGS. 7 to 14, the male part 77 has a diameter of around 55 mm. The male and female parts engage by a length of at least 10 mm.

Preferably all contacting surfaces are bonded using a suitable adhesive for bonding the two components. For example for the preferred urethane outer materials a suitable syntactic adhesive may be a methacrylate or epoxy based adhesive. For the alternative polyester materials a suitable adhesive may be Plexus MA300.

The columns may include an enclosed low density core, for example as in the embodiment of FIGS. 1 to 5. Alternatively the columns may be substantially hollow. For example the columns may open to below the pallet, with an upper end closed as in the embodiment of FIGS. 7 to 9, or may be open at the upper and lower ends and be closed by the upper deck part.

In the preferred embodiment the pallet is formed from a urethane resin. Preferably the predominant urethane in the construction is a two part polyurethane. The urethane may include additives to achieve desirable properties, such as a flame retardant, a colouriser, or other fillers or property enhancing adducts.

Examples of a preferred plastic resin include: Bayer Baydur SRIM polyurethane resins, or B.A.S.F. SRIM Polyurethane Resins. An example of a preferred flame retardant additive is Alumina Trihydrate. These materials can allow the pallet to be recycled at the end of its lifespan.

A UV stabiliser additive may be included in the material if required.

A typical overall material composition for the pallet (by weight) would be:

| Material | % by weight |
| --- | --- |
| Urethane Resin | 45 |
| Surfactants | 0.3 |
| Pigment | 1.3 |
| Filler | |
| Release agent | 1.5 |
| Fibre | 30 |
| Urethane core | 20 |
| Foaming agent | 1.0 |
| Other additives | 0.9 |

The pallet embodiment of FIGS. 7 to 9 is particularly suited to this SRIM construction.

Alternatively the pallet may be formed from other plastics, for a thermoset plastic such as polyester. The plastic may include additives to achieve desirable properties, such as a flame retardant, a catalyst, and a colouriser.

Examples of a possible plastic resin include: NCS989 Isophthalic polyester resin. An example of a preferred flame retardant additive includes SB-432 Alumina Trihydrate. An example of a preferred catalyst additive includes BPiC 75 Trignox 149. An example of a preferred colouriser additive includes Polychrome Pigment Pastes.

These materials also allow the pallet to be recycled at the end of its lifespan.

Thermoset plastics such as polyester contain a naturally occurring UV stabiliser. Typically no further UV stabiliser additives are necessary. Alternatively a UV stabiliser additive may be included in the material if required.

A typical resin composition may comprise the following ratio of materials for Dough Moulding Compounding (DMC) and Sheet Moulding Compounding (SMC):

| | DMC | SMC |
| --- | --- | --- |
| Polyester Resin | 18 | 17 |
| Low shrink Additives | 6 | 11 |
| Surfactants | 0.3 | 0.3 |
| Catalyst | 0.4 | 0.4 |
| Pigment | 1.3 | 1.3 |
| Filler | 57.5 | 43 |
| Release agent | 1.5 | 1.5 |
| Glass | 15 | 25 |
| Thickening agent | — | 0.5 |

The polyester thermoset process is considered less preferable than the SRIM polyurethane process due to longer cycle times required in manufacturing each pallet.

The plastic is reinforced with a suitable fibre to improve tensile strength, and ultimately to improve the strength and stiffness of each component of the pallet. The reinforcement is preferably a substantial proportion by weight of fibre-strands, such as glass fibre, aramid fibre or other reinforcing fibre. Alternatively, but less preferably, the reinforcement may consist of a framework of steel rods inserted in the upper deck, lower deck or both.

Figure 5:
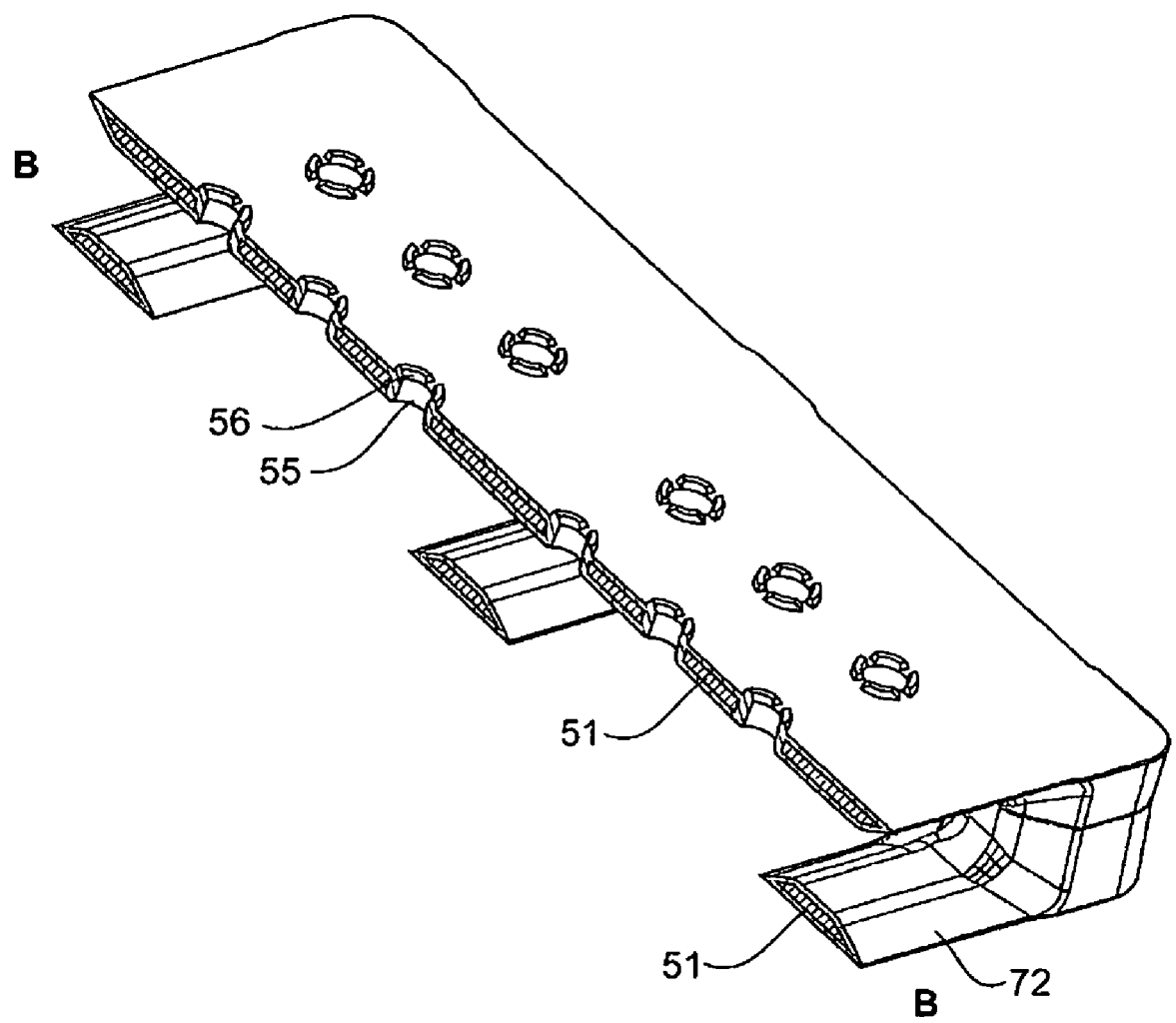
FIG. 5 is a perspective view sectioned along line BB in FIG. 3.

Each of the major components, the upper deck member 41 (or 71) and the lower deck member 42 (or 72), includes a low density core 51 (81) as shown in FIG. 5 (or FIG. 8 respectively). Preferably the low density core is a single pre-formed foam insert. Alternatively the low density core may comprise a plurality of rigid foam inserts either contacting or non-contacting within the resin matrix.

In the SRIM manufacturing process the foam inserts are held in a closed injection mould, surrounded by a fibre pre-form. The fibre is wrapped around the foam pre-form inserts, nesting the foam pre-form insert or inserts within the fibre. The fibre is pre-formed around the nested foam pre-form insert or inserts prior to insertion into the mould. The nested foam and fibre perform may be a single assembly. Alternatively, separate nested foam and fibre pre-forms may be individually placed within the closed mould. The mould is then closed. The polyurethane resin is injected into the residual mould cavity to surround the inserts and fully penetrate the fibre pre-form. Preferably the polyurethane resin is injected into the residual mould cavity to surround the inserts and fully penetrate the fibre perform and partially penetrate or bond to the foam inserts. The injected plastic resin surrounds the fibre pre-form to achieve a thin fibre-less pallet surface.

Alternatively, the fibre reinforced pre-form may be sprayed with uncured liquid plastic resin. Prior to complete curing of the plastic, the plastic coated fibre reinforced pre-form is placed in a mould. The mould is closed, with excess plastic expelled from the mould via pathways to the exterior of the mould.

Alternatively, the inside surfaces of the mould may be sprayed with uncured liquid plastic resin. Prior to complete curing of the plastic, the fibre reinforced pre-form is introduced to the mould. The mould is closed, with excess plastic expelled from the mould via a pathway to the exterior of the mould.

Alternatively, the fibre reinforced pre-form and inside surfaces of the mould may be sprayed with uncured liquid plastic resin. Prior to complete curing of the plastic, the plastic coated fibre reinforced pre-form is placed in the mould. The mould is closed, with excess plastic expelled from the mould via a pathway to the exterior of the mould.

The lower deck comprises a perimeter square or rectangle of four side beams, together with one or more crossbeams passing through the centre of the pallet. Preferably a pair of crossbeams 75 passes through the centre 70 of the pallet meeting and crossing at the centre. Most preferably the crossbeams 75 are positioned and aligned to create (together with the columns 14 and upper deck 10) the aforementioned frames defining the fork receiving channels, and extend from the centre column location of one side to the centre column location of the opposite side.

One benefit of utilising a fibre pre-form is that particular fibre orientations may be predetermined. The preferred fibre preform would have 50% of the fibre running longitudinally and 40% of the fibre running diagonally in the lengthwise directions of each beam 75 and about 10% transversely to the beam length. These are considered ideal numbers, in practice the fibre arrangements are not accurately achievable to such tolerances.

The fibre pre-form provides fibre reinforcement of the outer plastic shell. The plastic fully penetrates and surrounds the fibres of the fibre pre-form. The present invention comprising a fibre pre-form and injected plastic resin surrounding the fibre pre-form results in the outer surface of the pallet being substantially smooth and free of fibres. Other reinforcement methods comprising injection of plastic resin preloaded with fibres prior to injection into a mould result in fibres at the surface of the pallet. Fibres in the surface of the pallet are undesirable as the fibres can retain dirt or absorb contaminants. A fibreless skin or outer surface provides a more hygienic surface that is easier to clean.

The foam insert occupies a substantial proportion of the volume of each of the members 41(or 71), 42(or 72), and conforms to the general shape of each member. Preferably the low density core is entirely surrounded by a thickness of reinforced plastic. Preferably the thickness of the plastic does not vary substantially over each component. For example the material thickness may be between 1.5 mm and 5 mm across the full area of each component and vary as is required for manufacture.

Each foam core insert may be formed by any suitable process. For example a suitable material such as polyurethane may be injected into a closed mould in combination with a suitable foaming agent.

Alternatively the fibre pre-form may be formed in the approximate shape of each of the members 41 (or 71) and 42 (72), with holes through the fibre pre-form providing access to an internal cavity of the fibre pre-form. The cavities allow foam to be injected to fill the fibre pre-form to form the nested foam and fibre pre-form. However, this method is not preferred, as injection of foam into the fibre pre-form may penetrate a portion of the fibre pre-form, preventing full penetration of the fibre by the injected plastic resin. Full penetration of the fibre pre-form by the plastic resin injection is desired for improved strength characteristics.

To provide additional tensile strength to the pallet, steel rods may be inserted into the resin matrix alongside the foam inserts. Alternatively the steel rods may be used instead of the foam inserts. The steel rods preferably extend substantially along the length of each side and cross beam. Alternatively the steel rods form a frame and the urethane material is formed around the outside of the frame.

The addition of steel inserts is determined by the particular strength and cost requirements of each pallet. For example, a pallet required to be low cost and require a low load rating may not require any reinforcing. Long-fibre injection moulding (LFI) and other lower strength manufacturing alternatives can be used in lower cost or less strength applications.

A pallet required to bear heavy loads may require the addition of steel rods for extra tensile strength, or other high strength reinforcing rods.

The upper deck member 71 or lower deck member 72 may be manufactured by, for example, reaction injection moulding plastic to surround a fibre surrounded core material preformed and placed in a two-piece mould. Alternatively each member may be formed by inserting the foam core into a two-piece mould to provide a residual cavity around the two-piece core, with suitable support for the foam or steel core within the mould, and injecting a fibre loaded resin into the residual cavity provided the mechanical properties of the resin meet the performance requirements of the design. Alternatively the upper deck member 41 or lower deck member 42 may be manufactured by, for example, pressure forming a sheet of fibre reinforced plastic material over the outside of the pre-formed core in a two-piece mould.

The nature and quantity of fibre reinforcement for each of the upper deck and lower deck may be selected according to the load requirement and manufacturing cost. Some manufacturing processes, such as LFI and SRIM covering over the foam or steel core, may allow for variation of the fibre density and composition throughout the area of the product and through the thickness of the resin layers.

Typical fibre loading will be in excess of 40% of the urethane layer 30 by weight. The pallet construction comprising a fibre pre-form allows such a high fibre content to be achieved in the pallet outer plastic resin shell 30. Injection moulding a pallet with plastic resin preloaded with reinforcing fibres prior to injection may not achieve such a high fibre content due to the complex geometry of the pallet.

Design simulations and test data have shown that a fibre loading ratio in this range can provide a pallet capable of withstanding a two-tonne load. In load testing, the pallet of the present invention has achieved a 2 tonne load capacity while weighing less than 30 kg. The 2 tonne load capacity was achieved in both a selective racking situation and an edge racking situation, as required by Australian standard AS 4068-1993 Flat Pallets for Material Handling.

In accordance with generally followed standards for material handling pallets the preferred overall form of the pallet is a square or rectangle. For example the pallet may be a 1165× 1165 square. Alternatively the pallet may be a rectangle approximately 1200 mm×1000 mm in plan.

Preferably the pallet is 150 mm deep to meet standards set by Australian pallet protocols. Alternatively the pallet is between 140 mm and 200 mm deep. The imperial standard prevailing in the USA varies slightly from the metric standard prevailing in Europe and a pallet may be made that is a compromise between the dimensions provided in each standard that may meet the requirements of both standards.

In the preferred forms of the invention, the lower deck 12 includes a number of substantial openings in the regions that do not form part of the frames defining the fork insertion channels. In practice this allows for four large square or rectangular openings 29 in the base of the pallet.

To reduce the potential for any stress raising features in the construction the corners of the openings 29 are preferably formed with a substantial radius.

The large openings in the lower deck of the pallet allow for drainage and airflow, and reduce the weight of a part of the product that does not contribute as much to the strength and utility of the pallet as the upper deck.

The square or rectangular openings 29 are also designed to accommodate a hand pallet trolley jack. The rear wheels on the hand pallet trolley jack locate above the openings in the lower deck. The rear wheels on the pallet jack extend through the openings in the lower deck to hoist the pallet for transportation.

The upper surface 61 and lower surface 62 of the lower deck 12 are substantially smooth, although the lower surface 62 of the lower deck may have shallow ridges formed on it for stability.

In the embodiment of FIGS. 7 to 9 the upper surface 63 and lower surface 64 of the upper deck 10 are also substantially smooth and do not have any significant cavities. The upper surface of the deck is textured to provide grip on the upper deck for product stacked on the pallet. In one preferred form there are six tapering indentations 90 on the upper surface of the upper deck radiating out from the centre of the top surface 92. These tapered indentations allow moisture and air flow to take place above the pallet surface.

In the embodiment of FIGS. 1 to 5, the upper surface 63 and lower surface 64 of the upper deck 10 are also substantially smooth and do not have any significant cavities. The surface of the upper deck preferably includes a plurality of cleat formations 45. The cleat formations are distributed over the surface of the upper deck to provide grip on the upper deck for product stacked on the pallet.

The cleats 45 preferably comprise a local pattern of ridges protruding from the surface. The cleats may, for example, rise to a height of 3-8 mm from the general surface of the deck.

In the preferred form the upper deck includes a corresponding plurality of apertures 55 passing through the deck, with a cleat associated with each aperture. In the preferred form, each cleat comprises an annular ridge 56 rising from the plane of the upper deck 10, surrounding an aperture. For each cleat a series of valleys or channels run across the cleat to the aperture so that liquids spilled on the top surface of the upper deck may reach the apertures.

Preferably the cleats are aligned with the large openings 29 in the lower deck to provide a stable nesting arrangement between adjacent pallets in a stack.

The cleats are present only on portions of the top surface of the upper deck that are directly above the large openings 29. For example as shown in FIG. 4, two groups of cleats are shown. One group of cleats is provided above each large opening in the lower deck. In each group, peripheral cleats in the group are arranged closely adjacent the vertical projection of the perimeter of the large opening of the lower deck 12. When multiple similar pallets are stacked, the upwardly protruding cleats of one pallet protrude into the large openings in the lower deck of the immediately adjacent pallet. With the cleats positioned to be closely adjacent the perimeter of the large openings the adjacent pallets are held against relative lateral movement.

In either embodiment, the upper deck 10 may have an additional relief pattern, perhaps including branding or advertising, on its upper surface 63 in the region that is not directly above the large openings of the lower deck 2. This relief pattern may provide useful grip in those regions. The relief pattern preferably extends no more than 2 mm, and preferably no more than 0.35 mm, from the general plane of said upper surface 63.

Each side beam and each crossbeam has an upwardly facing chamfer 52 along each edge in the region of the fork receiving channels. These chamfers serve to guide the tips of inserted forks through the channel and reduce the incidence of fork tips butting against, and damaging, bluff surfaces of the pallet.

A hand pallet trolley jack has insufficient ground clearance to avoid butting against the side of each side and crossbeam. The upwardly facing chamfers 52 also act as a ramp to such pallet jacks. When the hand pallet trolley jack engages the pallet it is guided over each side beam and crossbeam by the chamfers.

Similarly, downwardly facing chamfers 53 are preferably provided on the outer edges of the upper deck in the region of the fork receiving apertures. Preferably areas where the columns meet the lower deck member in the region of said fork receiving apertures have a substantial radius 67. In the embodiment illustrated in FIG. 4, areas where the column 14 meets the upper deck member in the region of the fork receiving apertures have a substantial radius 67. In the preferred embodiment of FIG. 11, radius 67 is not provided between the column and upper deck member, as the top of each column 73 is connected to the upper deck member, and is not integrally formed with the upper deck member 71.

To protect the upper deck from the forks, a shallow rim may be provided around the perimeter of the underside of the upper deck. For example the upper deck of the embodiment of FIGS. 7 to 9 includes a shallow perimeter rim 102.

Figure 13:
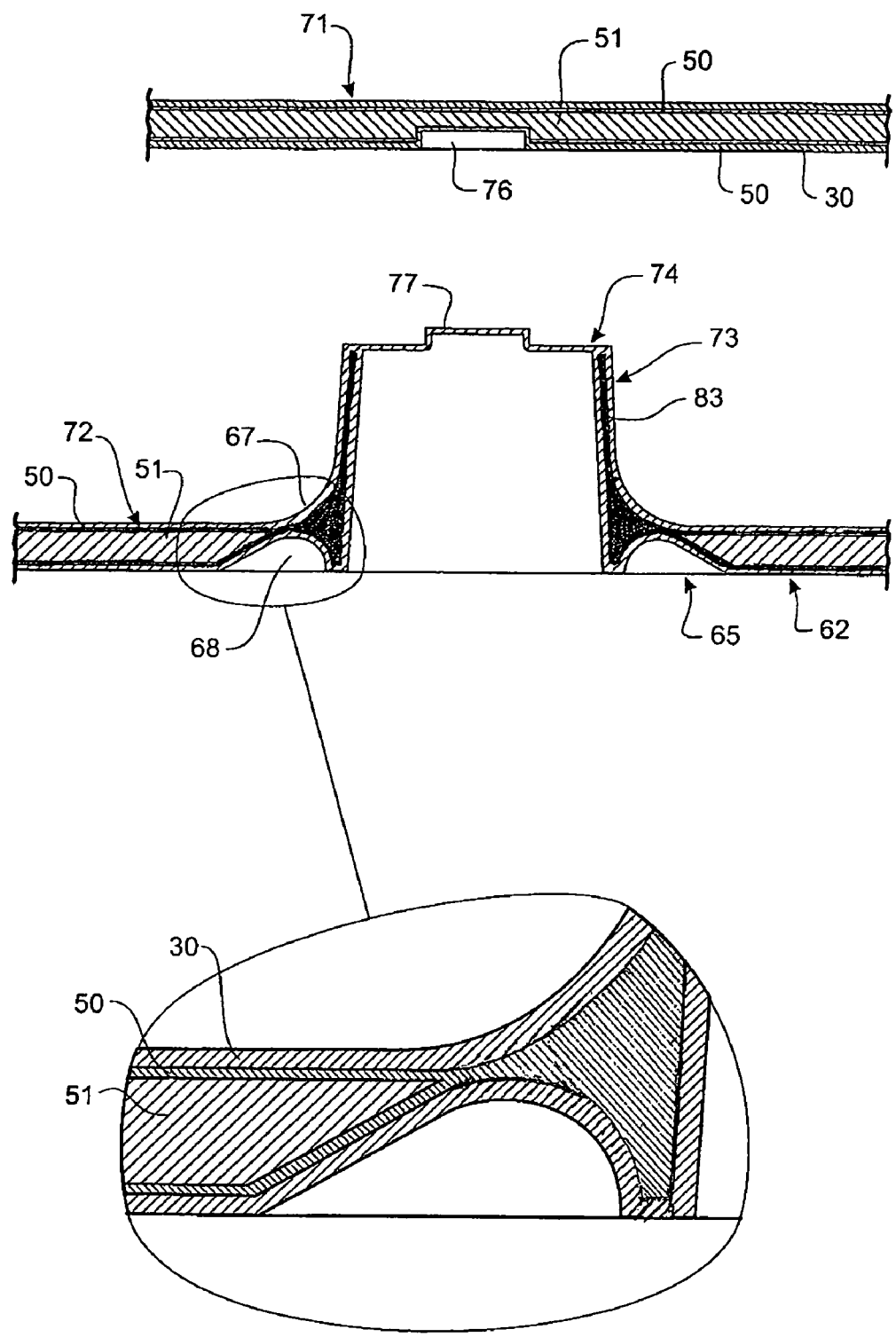
FIG. 13 is an exploded diagrammatic sectional view along line D-D in FIG. 9.
Figure 14:
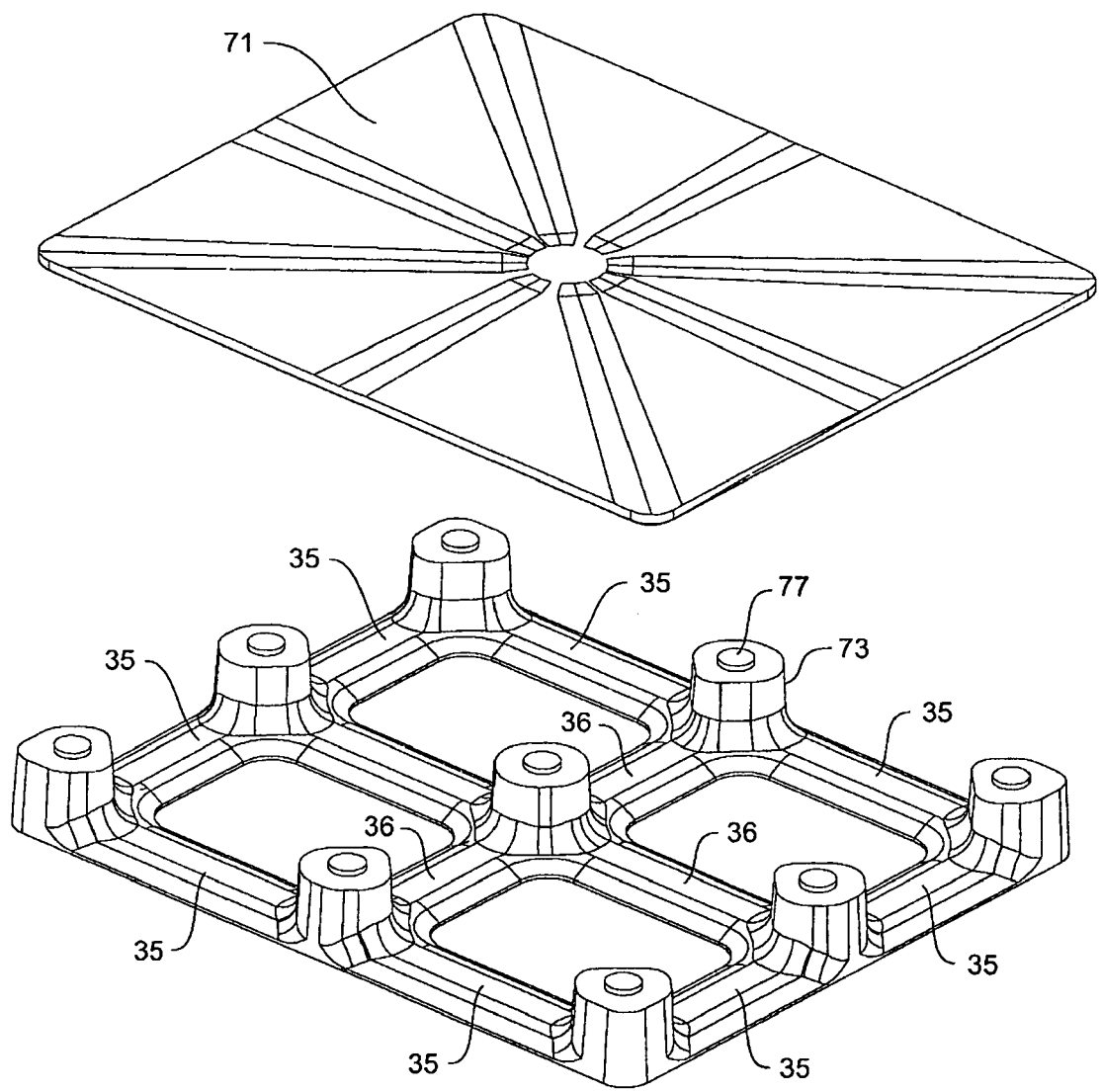
FIG. 14 is an exploded perspective view of the pallet of FIG. 7.
Figure 15:
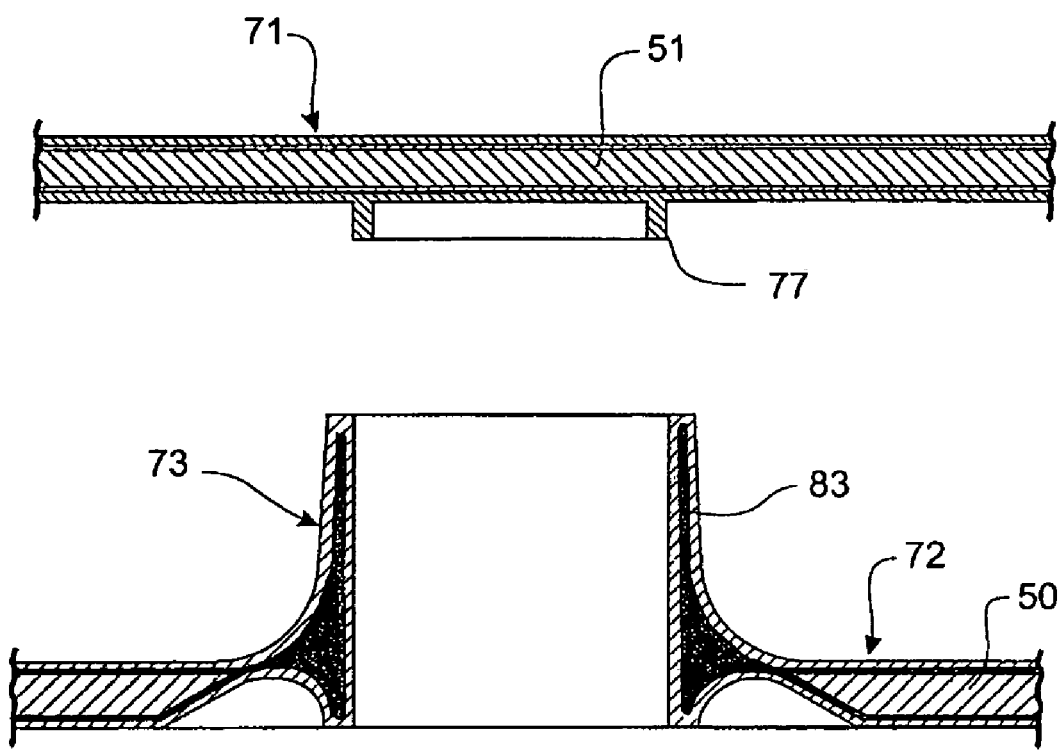
FIG. 15 is an exploded diagrammatic sectional view of a pallet according to a third embodiment of the present invention.

As best shown in FIGS. 8 and 11, the pallet comprises hollow columns 73. FIG. 13 illustrates the column and integral lower deck member 72. Hollow columns have a vertical perimeter wall 83. The upper end of the column may or may not be closed as previously described.

The perimeter wall 83 is solid plastic resin without a foam core pre-form insert 51. The perimeter wall 83 is solid plastic resin with fibre reinforcement. Alternatively, the solid plastic column wall 83 may be without reinforcing fibres. The fibre pre-form 50 described herein may extend into the column perimeter wall 83 to provide fibre reinforcement to the column wall 83. The fibre pre-form conforms to the general shape of the pallet.

The column perimeter wall 83 extends in a vertical direction from the upper deck member 71 through the lower deck member, extending to a lowermost position of the pallet. The columns 73 may extend through the lower deck member to be substantially in plane with a bottom surface 62 of the lower member. By extending the column through the lower deck member 72, vertical loading applied to the pallet is transmitted from an upper surface of the pallet through the columns to a supporting structure or surface 65, such as a floor, below the pallet. In the less preferred embodiment of FIG. 4 comprising foam filled columns, vertical forces are transmitted to a supporting surface below the pallet via the columns comprising a combination of outer plastic shell and internal low density foam. In high loading conditions, this arrangement may result in stress fractures occurring in the relatively thin outer plastic resin shell in areas where the vertical column interfaces with the lower deck member, as indicated by item number 49 in FIG. 4. The improved pallet construction of FIGS. 8, 11 and 13 helps to alleviate the problem of failure at the column to lower deck member interface. One possible failure mode for plastic pallets is cracking at the interface between the column and the lower deck member.

The improved pallet construction illustrated in FIG. 13 comprises a scalloped portion 68 in the bottom surface of the lower deck member, the scalloped portion extending around the base of the column 73. The foam pre-formed inserts 51 are spaced from the column 73 by a joining region of the lower deck member such that vertical forces transmitted via columns 73 are transferred directly to the support surface or floor and not via the foam inserts of the lower deck member.

The solid plastic resin joining region between the column wall and the foam pre-form deck member allows for some flexibility. Any flexibility of the pallet to accommodate variable floor surface levels is accommodated by the joining regions defined by the scallops at the base of each column.

Pallet weight is conserved by having scalloped portions 68 as opposed to having solid plastic regions between foam inserts 51 and column walls 83. The radius profile of the scalloped portion avoids introducing stress raising features.

With the columns 73 extending through the lower deck member, the lower deck member generally comprises eight side members 35 and four centre members 36 integrally formed with columns 73. Each side member 35 extends between a corner column and a centre side column. Each centre member extends between a centre side column and the central column 22.

As shown in FIG. 8, each scalloped portion 68 extends around the base perimeter of each column 73. The scalloped portion 68 extends completely around the central column 22, between the column and the four centre members 36 extending from all four quadrants of the central column. The scalloped portion 68 extends around side centre columns, for example column 18, between two side members 36 and one centre member 35. The scalloped portion 68 extends around corner columns, for example column 20, between two side members 36. Scalloped portion 68 has a curved section where the scalloped portion meets the wall of the column 73. The scalloped curved section preferably has a radius of curvature of around 20 mm. The radius of curvature of the scalloped portion defines the depth of the scalloped portion.

The radius between the columns and the upper surface of the lower deck member preferably has a radius of curvature of around 40 mm.

The thinnest vertical section through the solid plastic resin section between the foam insert and the column wall 83 is approximately 10 mm.

The approximate thickness of the column wall 83 is 10 mm.

The lower deck member has a thickness of around 26 mm. For a skin thickness of approximately 3 mm, the foam pre-form insert has a corresponding thickness of around 20 mm.

The upper deck member has a thickness of around 26 mm. For a skin thickness of approximately 3 mm, the foam pre-form insert has a corresponding thickness of around 20 mm.

The fibre pre-form and plastic resin shell may be thickened in areas of high stress or high impact. For example, the reinforced edges of the upper deck member may have an increased thickness of 5 mm to 10 mm. The reinforced edges of the lower deck member may have an increased thickness of 5 mm to 15 mm. The fibre pre-form substantially conforms to the shape of the pallet. For example, the fibre pre-form in the joining region of the lower deck member to column interface may substantially conform to the shape of the pallet as illustrated in FIG. 13.

Figure 6:
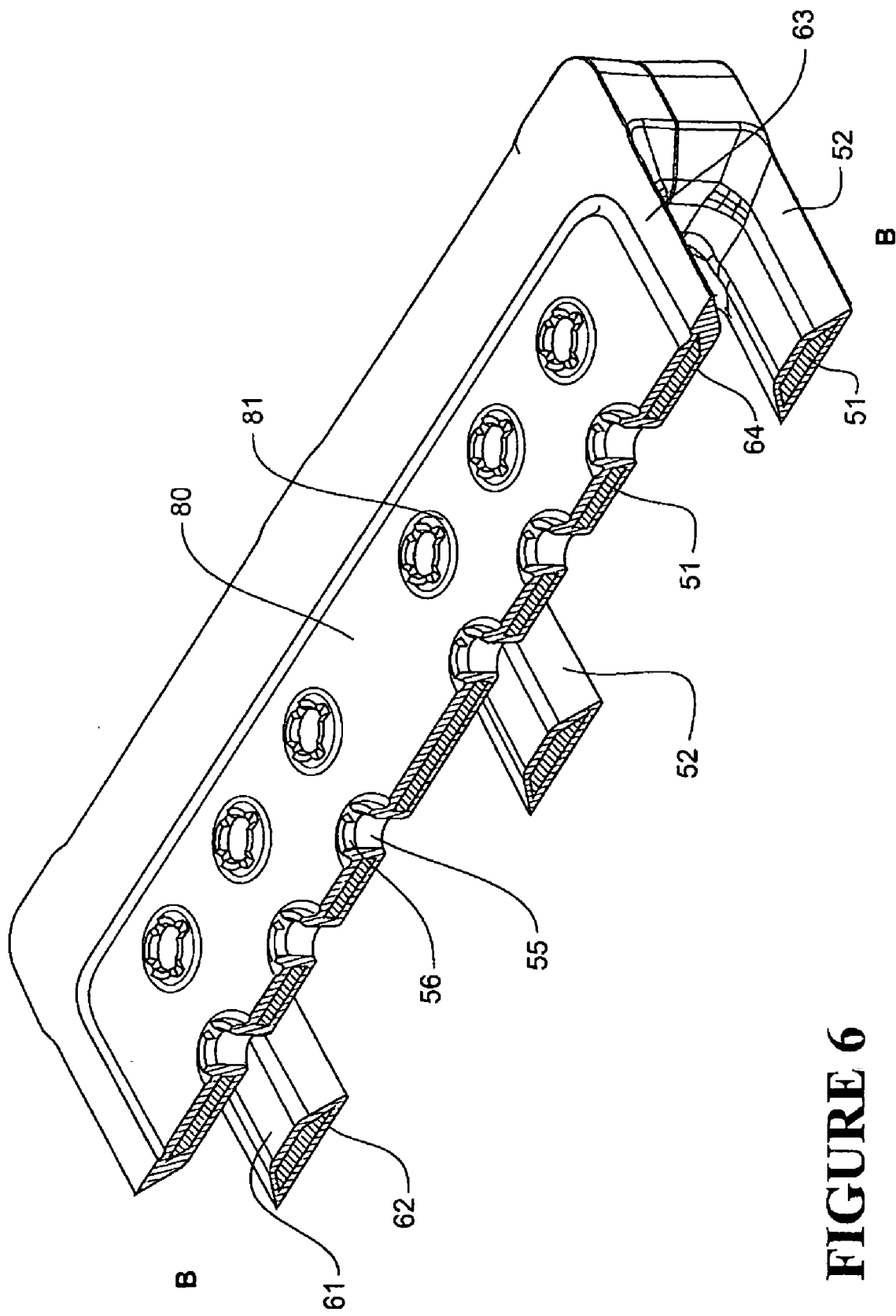
FIG. 6 is a perspective view sectioned as in FIG. 5 of a pallet according to a variation including advertising inlay.

Accordingly to a further aspect in the invention, and referring to FIG. 6 an advertising inlay 80 may be provided in the upper surface of the upper deck. The advertising inlay may for example comprise a preprinted sheet material. The sheet material may be any suitable sheet material that will bond acceptably with the base urethane material of the pallet. In a pallet having cleats or apertures, such as the pallet of FIGS. 1 to 5, the advertising inlay 80 may be provided in those regions having the cleats 45 and apertures 55 and may include suitable openings 81 in alignment with the cleats and apertures. The inlay may be included as a layer in a sheet forming process or as an insert in an injection moulding process.

The pallet according to the present invention has a form and construction that has the potential to achieve the required performance standards for rigidity, strength and durability while at the same time having full utility from all four directions and presenting smooth surfaces without any significant small cavities.

Pallet identification tags may be integrated into the pallet structure. The identification tags allow the pallet load to be easily and quickly identified. The identification tags may be active or passive Radio-Frequency (RF) identification tags. Alternatively the identification tags may be barcodes. Each identification tag is unique to each individual pallet. The identification tag is read remotely by a barcode scanning device or RFID reading device or similar. The identification tag allows the contents of the pallet to be electronically associated with the barcode or RFID signature. A database is stored on a computer or similar storage device. The database associates the individual pallet identification tag with a list of the items loaded upon the pallet.

Specialty constructions utilising materials, particularly fibre reinforcement material, with enough energy absorption characteristics to provide ballistic protection can also be incorporated into the pallet design to allow the pallet to be used as a shield or barrier to shrappenel and bullets.

The invention claimed is:

1. A pallet comprising
an upper deck and a lower deck, the upper deck and the lower deck being connected by a plurality of spaced apart columns,
fork insertion apertures formed by the upper deck, the columns and the lower deck and opening to all four sides of the pallet,
the upper deck being a hollow shell of reinforced plastic and including an upper deck member forming an upper planar exterior wall and partial column formations forming a lower exterior wall,
the lower deck being a hollow shell of reinforced plastic and including a lower deck member forming a lower planar exterior wall and partial column formations forming an upper exterior wall,
the lower deck and the upper deck including a low density core completely filling the upper deck and the lower deck between the upper and lower exterior walls of the upper deck and the lower deck,
the columns each including the partial column formations of the upper deck bonded to the partial column formations of the lower deck, and
each column including a first partial column formation including a male end part and a second partial column formation including a female end part, the male and female end parts engaging to join the upper deck and the lower deck,
the female end part of the second partial column formation being formed of only the respective hollow shell of the upper deck or the lower deck.

2. The pallet as claimed in either claim 1, wherein the low density core of the lower deck includes one or more contacting portions extending to the hollow shell of reinforced plastic.

3. The pallet as claimed in claim 1, wherein the low density core is formed from a foamed plastic.

4. The pallet as claimed in claim 1, wherein the lower deck includes at least one upwardly facing curved surface where an upper surface of the lower deck member meets a perimeter wall of at least one of the columns, the upwardly facing curved surface defining an upper surface of an interface region.

5. The pallet as claimed in claim 4, wherein the interface region includes reinforced plastic.

6. The pallet as claimed in claim 1, wherein the surrounding shell of reinforced plastic extends across an interface region between the columns and the lower deck member and/or upper deck member to form at least part of a perimeter wall of the columns.

7. The pallet as claimed in claim 1, wherein the lower deck includes eight side members, four center members, four corner columns, four side columns and a central column, each corner column is located at a corner position of the lower deck, each side column being located at a side of the lower deck between two adjacent corner columns, the central column being located at a center of the lower deck, each side member extending along a side of the lower deck between a corner column and an adjacent side column, and each center member extending between a side column and the central column, each side member and each center member includes a separate low density core.

8. The pallet as claimed in claim 1, wherein said plastic is reinforced with fibres.

9. The pallet as claimed in claim 1, wherein the low density core of the upper deck includes one or more contacting portions extending to the surrounding shell of reinforced plastic.

10. The pallet as claimed in claim 1, wherein the pallet has a fibreless outer surface.

11. The pallet as claimed in claim 1, wherein said plastic is predominantly polyurethane.

* * * * *